(12) United States Patent
Toyamasaki

(10) Patent No.: US 10,027,824 B2
(45) Date of Patent: Jul. 17, 2018

(54) IMAGE FORMING SYSTEM

(71) Applicant: KYOCERA Document Solutions Inc., Osaka (JP)

(72) Inventor: Kenta Toyamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/496,693

(22) Filed: Apr. 25, 2017

(65) Prior Publication Data

US 2017/0318168 A1    Nov. 2, 2017

(30) Foreign Application Priority Data

Apr. 28, 2016  (JP) ................. 2016-090238

(51) Int. Cl.
 *H04N 1/04* (2006.01)
 *H04N 1/00* (2006.01)
 *H04N 1/21* (2006.01)

(52) U.S. Cl.
 CPC ..... *H04N 1/00411* (2013.01); *H04N 1/00251* (2013.01); *H04N 1/00795* (2013.01); *H04N 1/2166* (2013.01)

(58) Field of Classification Search
 CPC .......... H04N 2101/00; H04N 1/00442; H04N 1/00461; H04N 1/32101; G06F 3/005; G06F 3/0481; G06F 2203/04806; G06F 3/1205; G06F 3/1208; G06F 3/1256; G06F 3/1284; G06F 3/13; G06F 17/30274; G06F 17/302
 USPC ..... 348/207.1, 333.05, 207.2, 231.9, 333.01, 348/333.12, E5.022, E5.042, E5.051; 715/788, 825, 200, 201, 274, 716, 717, 715/718, 719, 725, 744, 764, 765, 781, 715/792, 800, 817, 826; 345/611, 619, 345/629, 668; 358/1.15, 1.18, 302; 396/49
 See application file for complete search history.

(56) References Cited

U.S. PATENT DOCUMENTS

| | | | | |
|---|---|---|---|---|
| 8,947,711 | B2 * | 2/2015 | Kato ................. | H04N 1/00299 358/1.13 |
| 9,924,057 | B2 * | 3/2018 | Dandoko ........... | H04N 1/00891 |
| 2002/0006235 | A1 * | 1/2002 | Takahashi .......... | H04N 1/32128 382/305 |
| 2004/0041913 | A1 * | 3/2004 | Takasumi ........... | H04N 1/00278 348/207.2 |
| 2005/0141941 | A1 * | 6/2005 | Narusawa .......... | H04N 1/00132 400/76 |

(Continued)

FOREIGN PATENT DOCUMENTS

JP    2015-23538 A    2/2015

*Primary Examiner* — Negussie Worku
(74) *Attorney, Agent, or Firm* — Stein IP, LLC

(57) ABSTRACT

An image forming system includes an information terminal for storing therein a captured image, and an image forming apparatus for generating image data of a job page including a read image. The information terminal accepts an operation of laying out the captured image in the setting page and transmits layout information to the image forming apparatus. In order to discriminate the read image corresponding to the captured image as an object image and generate image data of the job page, the image forming apparatus makes a layout of the object image in the job page similar to the layout of the captured image corresponding to the object image in the setting page.

7 Claims, 8 Drawing Sheets

(56) References Cited

U.S. PATENT DOCUMENTS

| | | | |
|---|---|---|---|
| 2005/0174600 A1* | 8/2005 | Kitahara | H04N 1/00196 358/1.15 |
| 2005/0259173 A1* | 11/2005 | Nakajima | H04N 1/32101 348/333.12 |
| 2006/0215226 A1* | 9/2006 | Hoshino | G06F 3/0481 358/1.18 |
| 2007/0016855 A1* | 1/2007 | Masukawa | G06F 3/0481 715/201 |
| 2009/0221780 A1* | 9/2009 | Heilek | C07C 51/42 526/315 |
| 2013/0250354 A1* | 9/2013 | Kato | H04N 1/00217 358/1.15 |
| 2015/0031404 A1 | 1/2015 | Yada | 455/508 |
| 2016/0193674 A1* | 7/2016 | Bucks | B23D 61/121 83/835 |
| 2017/0090553 A1* | 3/2017 | Hiraike | G06F 1/3296 |
| 2017/0169595 A1* | 6/2017 | Hato | G06T 11/60 |

* cited by examiner

IMAGE FORMING SYSTEM

INCORPORATION BY REFERENCE

This application is based upon and claims the benefit of priority from the corresponding Japanese Patent Application No. 2016-090238 filed on Apr. 28, 2016, the entire contents of which are incorporated herein by reference.

BACKGROUND

The present disclosure relates to an image forming system equipped with an information terminal and an image forming apparatus.

Conventionally, there is known an image forming apparatus which is enabled to perform communications (transmission and reception of information) with information terminals such as smartphones and tablet terminals.

A conventional image forming apparatus performs communications with an information terminal in which a print application (application that allows the image forming apparatus to execute a job) has been installed. For example, the information terminal transmits print data to the image forming apparatus. The image forming apparatus, upon receiving the print data from the information terminal, executes a job based on the print data.

SUMMARY

An image forming system according to one aspect of the present disclosure includes an information terminal, and an image forming apparatus. The information terminal, including a camera module, stores therein a captured image obtained by image capturing of a document by the camera module. The image forming apparatus reads a document in execution of a job involving document reading to generate image data of a job page including a read image obtained by the document reading. The information terminal, after storing therein the captured image, displays a setting page to accept an operation of laying out the captured image in the setting page and transmit, to the image forming apparatus, layout information indicative of layout of the captured image in the setting page. In order to discriminate the read image corresponding to the captured image as an object image and generate image data of the job page including the object image, the image forming apparatus makes a layout of the object image in the job page similar to the layout of the captured image corresponding to the object image in the setting page.

DETAILED DESCRIPTION (Outline of Image Forming System)

Figure 1:
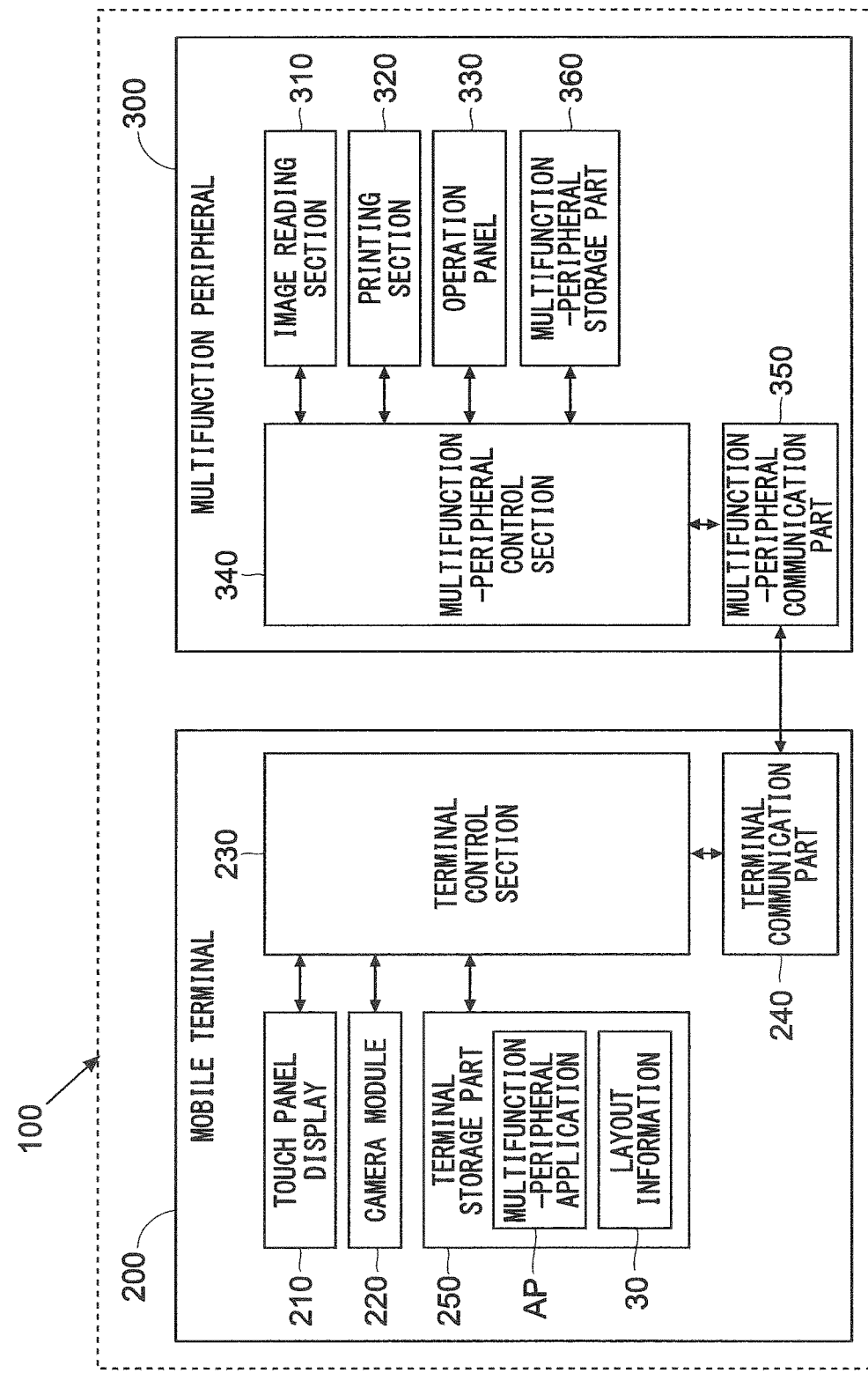
FIG. 1 is a view showing an image forming system according to one embodiment of the present disclosure.

As shown in FIG. 1, an image forming system 100 of this embodiment includes a mobile terminal 200 and a multifunction peripheral 300. For example, the mobile terminal 200, which is a smartphone or tablet terminal, is carried by a user of the multifunction peripheral 300. The multifunction peripheral 300 is an image forming apparatus on which plural types of functions such as scanning function and printing function are installed. It is noted that the mobile terminal 200 corresponds to 'information terminal,' and the multifunction peripheral 300 corresponds to 'image forming apparatus.'

The mobile terminal 200 and the multifunction peripheral 300, which are communicatably connected to each other, perform transmission and reception of various types of information such as image data. Although not particularly limited, wireless communications in compliance with communication standards for near field radio communication, wireless LAN and the like are performed between the mobile terminal 200 and the multifunction peripheral 300.

For example, the mobile terminal 200, upon accepting settings of job execution conditions from a user, transmits, to the multifunction peripheral 300, execution-condition information indicative of setting contents of the job execution conditions in the accepted settings. The multifunction peripheral 300, having received the execution-condition information, executes a job on the basis of the job execution conditions indicated by the execution-condition information. That is, the mobile terminal 200 instructs the multifunction peripheral 300 to execute a job based on the job execution conditions indicated by the execution-condition information. In this way, it is possible to make the multifunction peripheral 300 execute a job under user-desired job execution conditions even without performing setting operation for setting job execution conditions directly on the multifunction peripheral 300.

(Configuration of Mobile Terminal)

As shown in FIG. 1, the mobile terminal 200 includes a touch panel display 210 and a camera module 220. The touch panel display 210 displays various types of screens (e.g., a later-described layout setting screen 200S) to accept touch operations on the screen from the user.

The camera module 220 includes a lens, image sensors, a camera control circuit and the like to capture still images, motion images and the like. A still image or other images captured by using the camera module 220 can be displayed on the touch panel display 210.

The mobile terminal 200 also includes a terminal control section 230, a terminal communication part 240, and a terminal storage part 250. The terminal control section 230 includes a CPU, an image processing circuit, and the like. The CPU performs overall control of the mobile terminal 200 on a basis of control programs. The image processing circuit performs various types of image processing (e.g., image processing of images captured by the camera module 220).

For example, the terminal control section 230 detects a touch operation performed on the touch panel display 210 and makes the touch panel display 210 display a relevant screen. The terminal control section 230 also gives instructions to the camera module 220 to capture still images, motion images and the like.

The terminal communication part 240 includes a communication circuit and the like. The terminal communication part 240, which is controlled by the terminal control section 230, performs communications with the multifunction peripheral 300. The terminal storage part 250 includes memories such as ROM and RAM to store control programs therein (control programs are previously stored in ROM and developed to RAM). The terminal storage part 250 also stores images obtained by image capturing by the camera module 220.

In this case, the terminal storage part 250 has stored an application AP (hereinafter, referred to as multifunction-peripheral application AP) for performing settings as to a job to be executed by the multifunction peripheral 300. Using the function of this multifunction-peripheral application AP makes it possible to perform, by using the mobile terminal 200, settings as to a job to be executed by the multifunction peripheral 300. In addition, the multifunction-peripheral application AP is provided by the manufacturer of the multifunction peripheral 300. For example, the multifunction-peripheral application AP is downloaded to the mobile terminal 200 from an external server (not shown) via Internet communications.

For example, with the multifunction-peripheral application AP installed in the mobile terminal 200, the terminal control section 230 makes the touch panel display 210 display an icon (not shown) for accepting a start-up instruction of the multifunction-peripheral application AP from the user. Then, upon accepting the start-up instruction of the multifunction-peripheral application AP (a touch operation on the icon of the multifunction-peripheral application AP), the terminal control section 230 starts up the multifunction-peripheral application AP. As a result, the function of the multifunction-peripheral application AP is set available. Its details will be described later.

(Configuration of Multifunction Peripheral)

Figure 2:
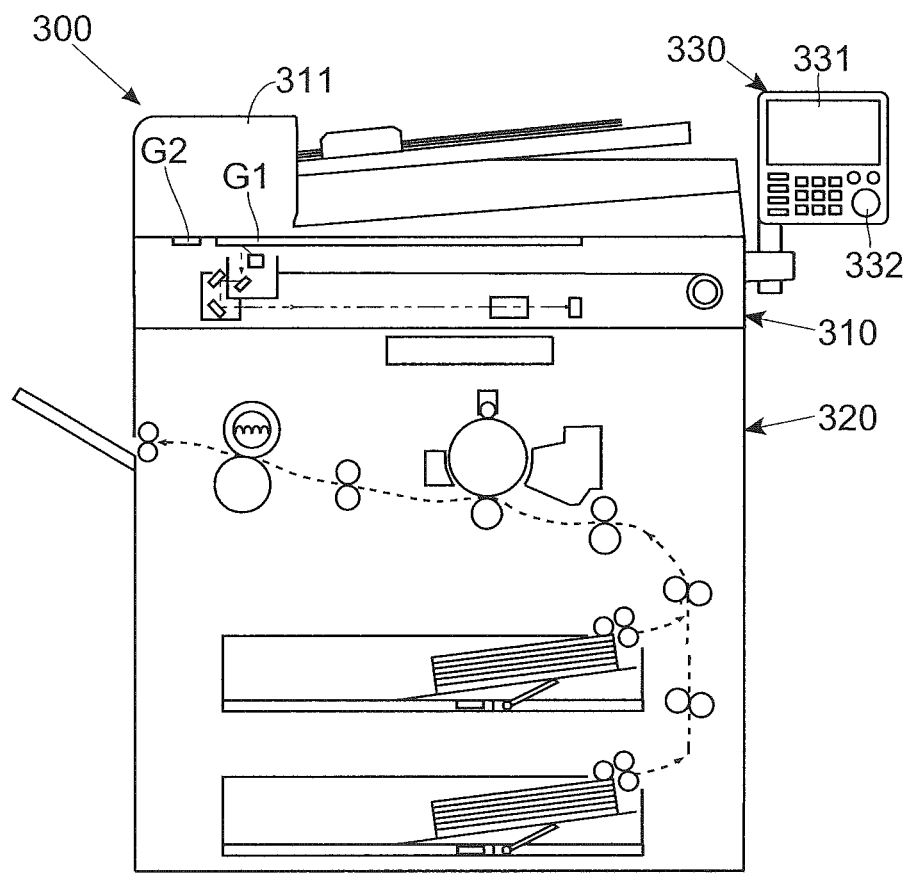
FIG. 2 is a multifunction peripheral forming part of the image forming system according to one embodiment of the disclosure.

As shown in FIG. 2, the multifunction peripheral 300 includes an image reading section 310, a printing section 320, and an operation panel 330.

The image reading section 310 is enabled to execute both mount reading for reading a document mounted on a contact glass G1 and conveyance reading for reading a document conveyed on a contact glass G2. For execution of the conveyance reading, the document is conveyed onto the contact glass G2 by a document conveyance unit 311. Then, the image reading section 310 executes reading of the document during passage of the under-conveyance document through on the contact glass G2.

The printing section 320, while conveying a paper sheet along a sheet conveyance path (the sheet conveyance path is depicted by broken line in FIG. 2), prints (transfers) on the conveyed sheet a toner image formed based on image data of an image to be printed. For example, the printing section 320 prints on the sheet an image of a document read by the image reading section 310.

The operation panel 330 includes a touch panel display 331 and hardware keys 332. The touch panel display 331 displays various types of screens to accept touch operations on the screen from a user. For example, the touch panel display 331 displays a screen (not shown) in which software keys for accepting settings related to a job are provided. The hardware keys 332 are provided in plurality on the operation panel 330. The hardware keys 332 are exemplified by a start key for accepting a job start instruction from the user.

The multifunction peripheral 300, as shown in FIG. 1, also includes a multifunction-peripheral control section 340, a multifunction-peripheral communication part 350, and a multifunction-peripheral storage part 360. The multifunction-peripheral control section 340 includes a CPU, an image processing circuit and the like. The CPU performs overall control of the multifunction peripheral 300 on a basis of control programs. The image processing circuit performs various types of image processing (e.g., image processing of images read by the image reading section 310).

For example, the multifunction-peripheral control section 340 controls reading operation of the image reading section 310 and printing operation of the printing section 320. The multifunction-peripheral control section 340 also controls display operation of the operation panel 330, and detects operation performed on the operation panel 330.

The multifunction-peripheral communication part 350 includes a communication circuit and the like. The multifunction-peripheral communication part 350, which is controlled by the multifunction-peripheral control section 340, performs communications with the mobile terminal 200. The multifunction-peripheral communication part 350 is communicatably connected to external devices such as a personal computer (a user terminal to be used by a user of the multifunction peripheral 300) and a facsimile. The multifunction-peripheral storage part 360, including memories such as ROM and RAM, stores therein control programs (control programs are previously stored in ROM and developed to RAM).

For execution of a copy job, as an example, the multifunction-peripheral control section 340 makes the image reading section 310 read a document to generate image data of a print page (corresponding to 'job page'), which is a page including a read image obtained by document reading. Then, the multifunction-peripheral control section 340 makes the printing section 320 execute printing of the print page.

As another example, for execution of a transmission job (a job of transmitting image data of a page to an external device), the multifunction-peripheral control section 340 generates image data of a transmission page (corresponding to 'job page'), which is a page including a read image obtained by document reading. Then, the multifunction-peripheral control section 340 makes the multifunction-peripheral communication part 350 transmit the transmission page.

(Layout Setting on Mobile Terminal)

After installation of the multifunction-peripheral application AP in the mobile terminal 200, starting up the multifunction-peripheral application AP makes it possible to set, with use of the mobile terminal 200, a layout of an image (laying position, size and orientation of the image) within a job page such as a print page or a transmission page generated by the multifunction peripheral 300.

The terminal control section 230, upon detecting an operation of starting up the multifunction-peripheral application AP (a touch operation on the icon of the multifunction-peripheral application AP), makes the touch panel display 210 display a menu screen (not shown). In this menu screen, a plurality of items including an item named layout setting are shown as choices.

Upon accepting an operation of selecting the item named layout setting (a touch operation on a display area corresponding to the relevant item) out of the plurality of items, the terminal control section 230, as is not shown, makes the touch panel display 210 display an image-capture request message for prompting the user to capture an image of a document which the user desires to lay out in the job page. In response to this, image capturing of the document using the mobile terminal 200 is carried out. In addition, in order that the image capture of the document is carried out sheet by sheet, a message indicative of the sheet-by-sheet image capture may be included in the image-capture request message. Then, after the image capture of the document, the terminal control section 230 generates image data of captured images obtained by the image capture of the document, and makes the captured images stored in the terminal storage part 250.

The terminal control section 230 also decides whether or not the image capture of the document has been completed after the display of the image-capture request message. For example, when detecting that a predetermined image-capture completion operation has been effected, the terminal control section 230 decides that the image capture of the document has been completed. Although not shown, the touch panel display 210 displays an image-capture completion key (software key). Then, the terminal control section 230 accepts a touch operation on the image-capture completion key as an image-capture completion operation.

Figure 3:
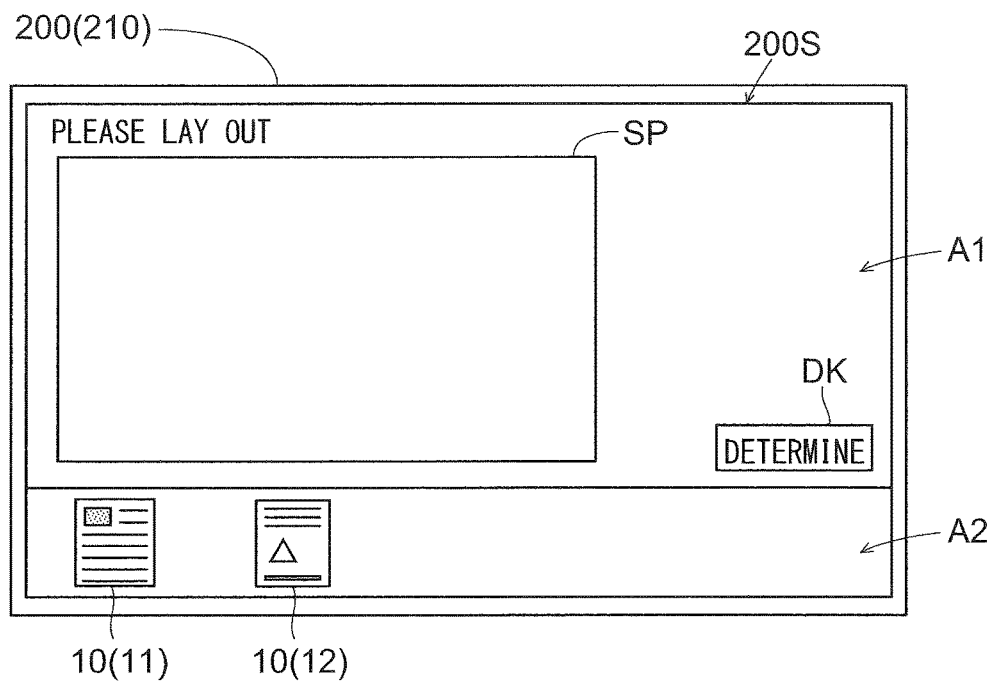
FIG. 3 is a view showing a layout setting screen to be displayed on a mobile terminal forming part of the image forming system according to one embodiment of the disclosure.

Upon deciding that the image capture of the document has been completed, the terminal control section 230 makes the touch panel display 210 display a layout setting screen 200S as shown in FIG. 3. The layout setting screen 200S is a screen for accepting layout setting from the user. The layout setting screen 200S is divided into a first area A1 and a second area A2. In the first area A1, a setting page SP is displayed. It is noted that size and orientation of the setting page SP are set by the user (arbitrarily changeable). In addition, size and orientation of a later-described job page JP (see FIG. 10) become identical to size and orientation of the setting page SP set in this case.

In the second area A2, captured images 10 obtained by the image capture of the document are displayed. Captured images 10 displayed in the second area A2 are images of the document captured during an effective period from when the image-capture request message is displayed until the image-capture completion operation is performed. That is, when a plurality of document images are captured during an effective period, the plurality of captured images 10 are displayed in the second area A2. In FIG. 3, a layout setting screen 200S in which a plurality of captured images 10 (captured images 11 and 12) are displayed in the second area A2 is shown as an example.

Figure 4:
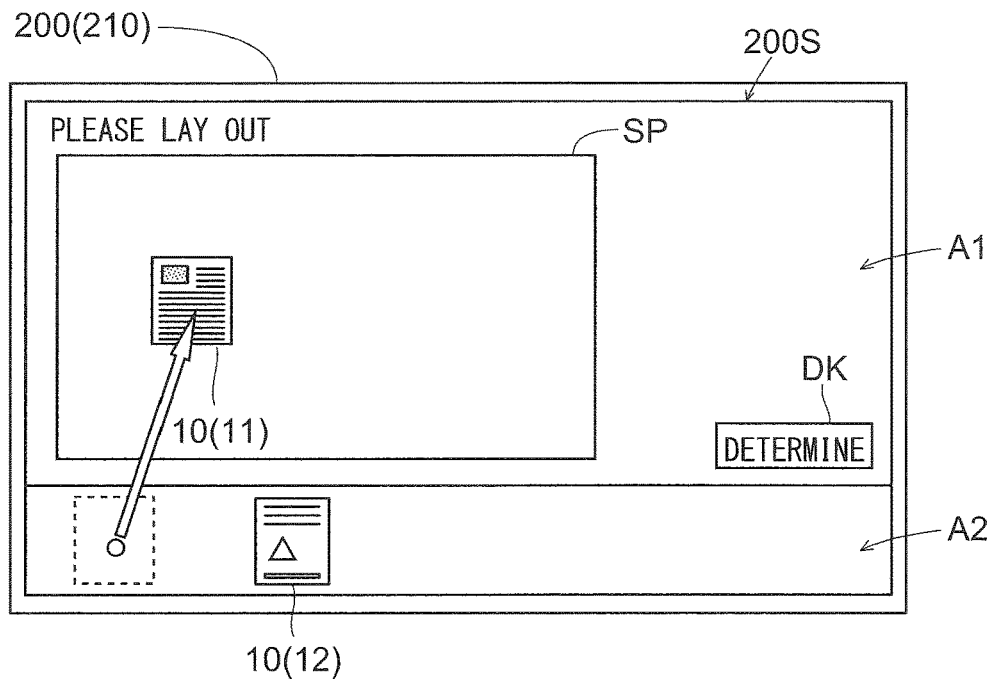
FIG. 4 is a view for explaining a layout operation (move operation) to be performed on the layout setting screen shown in FIG. 3.
Figure 5:
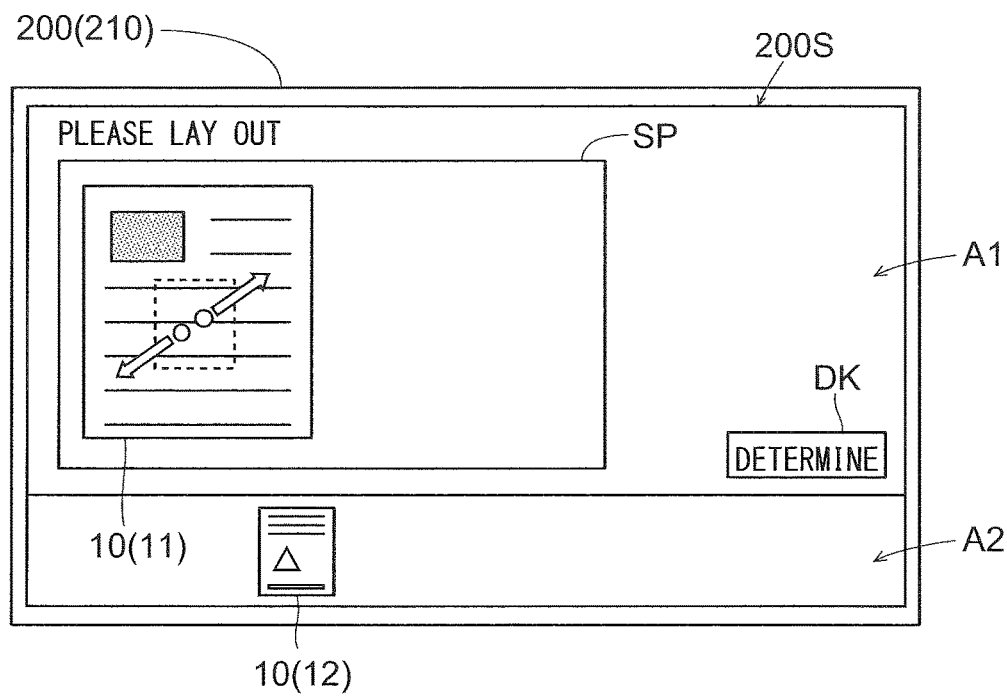
FIG. 5 is a view for explaining a layout operation (scale-up/scale-down operation) to be performed on the layout setting screen shown in FIG. 3.
Figure 6:
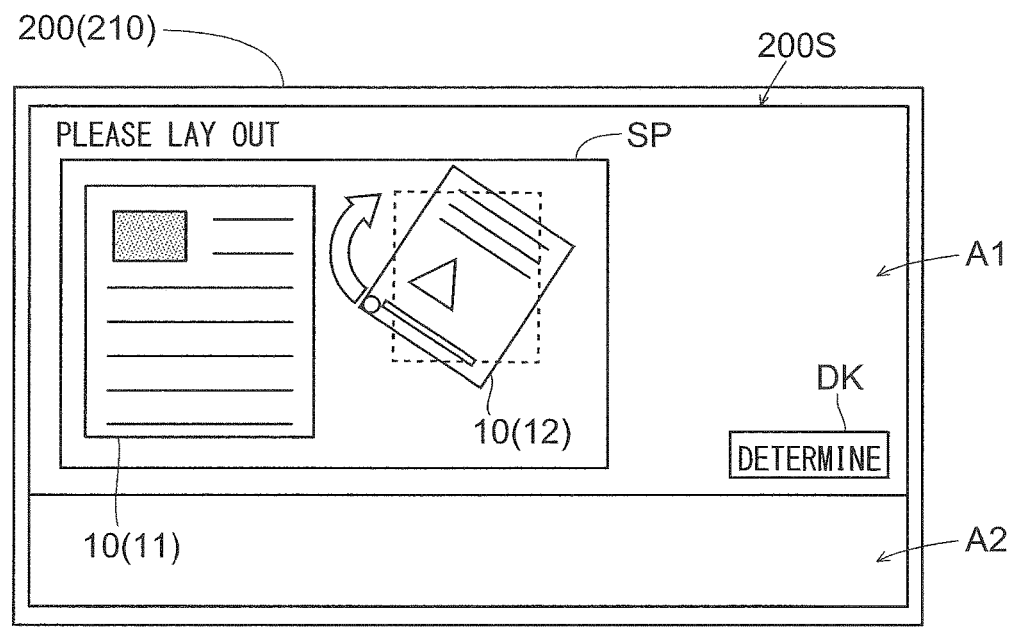
FIG. 6 is a view for explaining a layout operation (rotation operation) to be performed on the layout setting screen shown in FIG. 3.

After the display of the layout setting screen 200S, when detecting that a layout operation of laying out the captured images 10 in the setting page SP has been performed on the layout setting screen 200S, the terminal control section 230 lays out the captured images 10 in the setting page SP in response to the detected layout operation. The layout operation includes move operation, scale-up/scale-down operation, and rotation operation. Hereinbelow, the layout operation will be described with reference to FIGS. 4 to 6. In FIGS. 4 to 6, a touch point is depicted by a hollow circular mark, and a move direction of a touch point is depicted by a hollow arrow mark.

The move operation is an operation for moving a captured image 10, exemplified by such a touch operation as shown in FIG. 4. That is, when an operational process is performed in a sequence of touching one point at a central portion of the captured image 10, moving the touch point and then canceling the touch, the terminal control section 230 detects the operational process as a move operation. In FIG. 4, an outer edge of the captured image 10 before the move operation is depicted by broken line.

For example, when an operational process is performed in a sequence of touching one point at a central portion of the captured image 10 displayed in the second area A2, moving the touch point from the second area A2 into the first area A1 and then canceling the touch, the operational process is detected as a move operation, so that the captured image 10 displayed in the second area A2 can be moved into the first area A1. In addition, when a move operation is performed only within the setting page SP, the captured image 10 laid out at a position within the setting page SP can also be moved to another position within the setting page SP.

The scale-up/scale-down operation is an operation for scaling up or down the captured image 10, exemplified by such a touch operation as shown in FIG. 5. That is, when an operational process is performed in a sequence of touching two points of the captured image 10, elongating or narrowing the distance between the two points and then canceling the touch, the terminal control section 230 detects the operational process as a scale-up/scale-down operation. In FIG. 5, an outer edge of the captured image 10 before the scale-up/scale-down operation is depicted by broken line.

For example, when an operational process is performed in a sequence of touching two points of the captured image 10 laid out within the setting page SP, elongating the distance between the two points and then canceling the touch, the operational process is detected as a scale-up operation, so that the captured image 10 laid out within the setting page SP can be scaled up. In addition, although not shown, when an operational process is performed in a sequence of touching two points of the captured image 10 laid out within the setting page SP, narrowing the distance between the two points and then canceling the touch, the operational process is detected as a scale-down operation, so that the captured image 10 targeted for the scale-down operation is scaled down.

A rotation operation is an operation for rotating the captured image 10, exemplified by such a touch operation as shown in FIG. 6. That is, when an operational process is performed in a sequence of touching one point at an edge portion of the captured image 10, moving the touch point about a center of the touched captured image 10 serving as a fulcrum in a circular-arc drawing fashion and then canceling the touch, the terminal control section 230 detects the operational process as a rotation operation. In FIG. 6, an outer edge of the captured image 10 before the rotation operation is depicted by broken line.

For example, when a rotation operation is performed for the captured image 10 laid out within the setting page SP, the captured image 10 targeted for the rotating operation goes on rotating. That is, the orientation of the captured image 10 goes on changing. In addition, in this process, the captured image 10 may be rotated in units of 90°.

Figure 7:
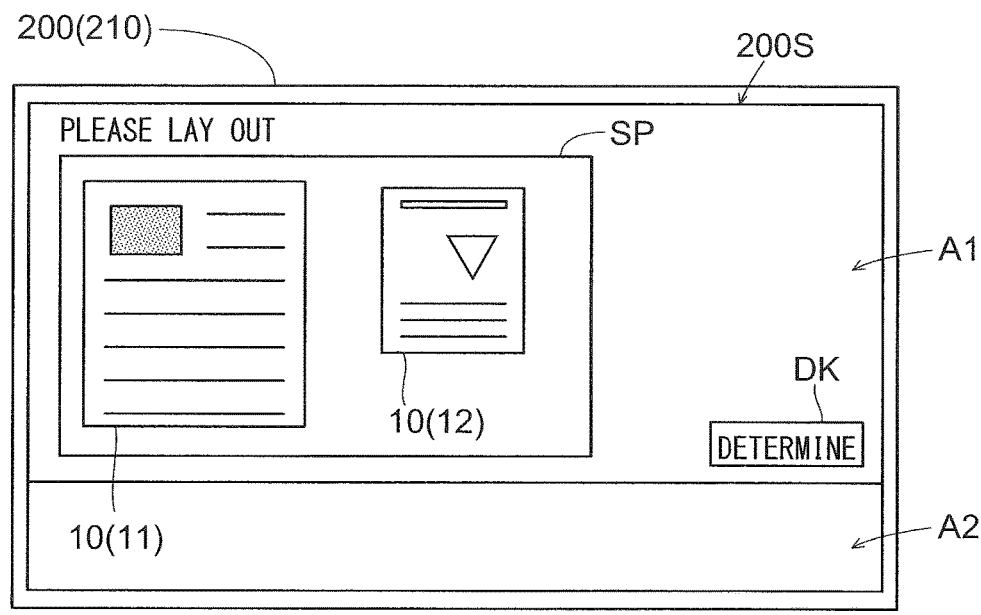
FIG. 7 is a view showing a state in which captured images are laid out in a setting page of the layout setting screen shown in FIG. 3.

Performing such layout operations as described above makes it possible to lay out the captured images 10 within the setting page SP, for example, as shown in FIG. 7.

When the captured image 10 is laid out within the setting page SP (when at least the move operation of moving the captured image 10 into the setting page SP is performed), the terminal control section 230 decides whether or not the layout of the captured image 10 has been determined. For example, when detecting that a predetermined determination operation has been performed, the terminal control section 230 decides that the layout of the captured image 10 has been determined. Although not particularly limited, the touch panel display 210 displays a determination key DK (software key) in the layout setting screen 200S. Then, the terminal control section 230 accepts a touch operation on the determination key DK as a determination operation.

Upon deciding that the layout of the captured image 10 has been determined, the terminal control section 230 sets, as a discriminant image 10D (see FIG. 8), a partial image resulting from cutting out part of the captured image 10 laid out within the setting page SP. For example, with a view to setting a discriminant image 10D, the terminal control section 230 makes the touch panel display 210 accept a selection operation of selecting a portion used as the discriminant image 10D out of the captured image 10. In this case, although not shown, the touch panel display 210 displays a message of prompting the user to make a touch on a portion of the captured image 10 where an image is present (a message of prompting a selection operation).

Figure 8:
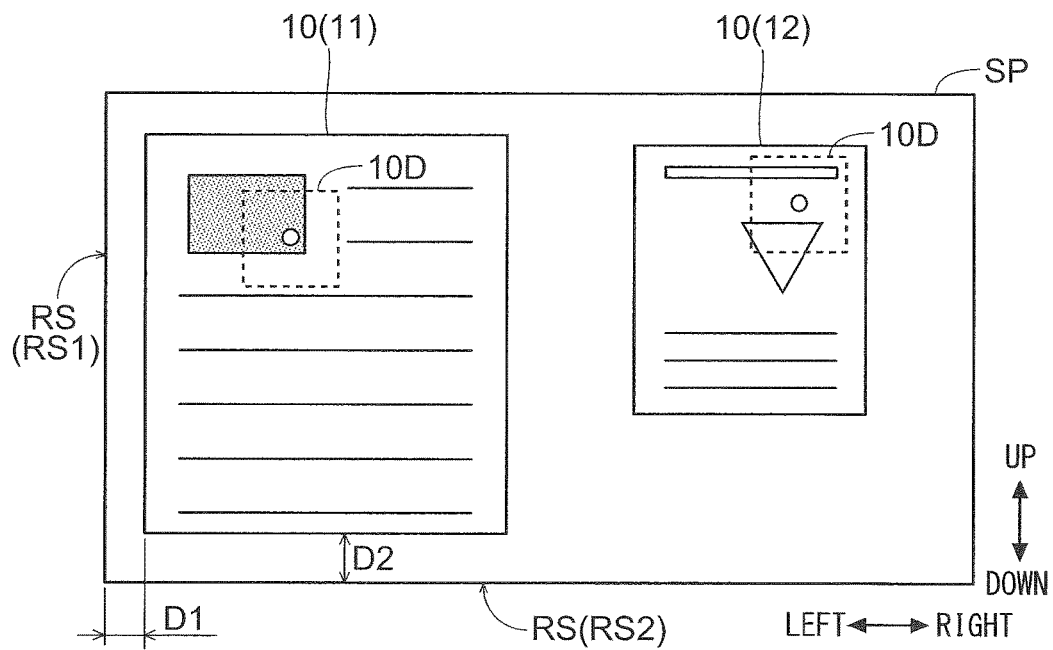
FIG. 8 is a view for explaining operations to be executed in selecting a discriminant image corresponding to a captured image laid out in a setting page of the layout setting screen shown in FIG. 3.

In response to this, as shown in FIG. 8, an operation of touching the position in the display area of the captured image 10 where an image is present (a selection operation) is performed by the user. In FIG. 8, a touch position is depicted by a hollow circular mark.

When the selection operation is performed, the terminal control section 230 sets, as the discriminant image 10D, a quadrilateral portion having a center at the touch point in the selection operation as an example. When a plurality of captured images 11 and 12 are laid out in the setting page SP, the process of setting a discriminant image 10D is performed for each of the plurality of captured images 11 and 12. That is, in this case, the selection operation needs to be performed for each of the plurality of captured images 11 and 12. When a captured image 10 unprocessed for the selection operation remains within the setting page SP, a message of prompting the selection operation continues being displayed.

After the setting of the discriminant image 10D, the terminal control section 230 makes the terminal storage part 250 store therein layout information 30 indicative of the layout of the captured image 10 in the setting page SP (see FIG. 1). In addition, the layout information 30 includes the discriminant image 10D.

It is noted here that the layout information 30 contains position data indicative of a laying position of the captured image 10 within the setting page SP, size data indicative of a size of the captured image 10 within the setting page SP, and orientation data indicative of an orientation of the captured image 10 within the setting page SP.

For example, in the setting page SP as shown in FIG. 8, one of a pair of sides opposed to each other in the left/right direction is assumed as a reference side RS, and one of a pair of sides opposed to each other in the up/down direction is assumed as a reference side RS. FIG. 8 shows a case in which the left side and the bottom side are assumed as reference sides RS, respectively (in this case, the left side as a reference side RS is designated by sign RS1, and the bottom side as a reference side RS is designated by sign RS2). Then, data indicative of a distance D1 from the left side RS1 of the setting page SP to the left side (edge) of the captured image 10, as well as data indicative of a distance D2 from the bottom side RS2 of the setting page SP to the bottom side (edge) of the captured image 10, are included as position data in the layout information 30. In addition, when the plurality of captured images 11 and 12 are laid out within the setting page SP, a plurality of position data corresponding to the plurality of captured images 11 and 12, respectively, are included in the layout information 30.

Also, data indicative of a ratio of the size of the captured image 10 to the size of the setting page SP is included as size data in the layout information 30. Further, data indicative of at least one of a left/right orientation and an up/down orientation of the captured image 10 within the setting page SP is included as orientation data in the layout information 30. For example, data indicative of an orientation of the discriminant image 10D within the setting page SP is assumed as orientation data. In addition, when a plurality of captured images 11 and 12 are laid out within the setting page SP, a plurality of size data corresponding to the plurality of captured images 11 and 12, respectively, are included in the layout information 30, and moreover a plurality of orientation data corresponding to the plurality of captured images 11 and 12, respectively, are included in the layout information 30.

(Transmission of Layout Information to Multifunction Peripheral)

Upon completion of layout setting on the mobile terminal 200, it becomes possible to transmit the layout information 30 from the mobile terminal 200 to the multifunction peripheral 300. For example, when completion of the layout setting on the mobile terminal 200 is succeeded by returning to the menu screen (not shown), an item of layout transmission is added as a choice. Then, when an operation of selecting the item of layout transmission (a touch operation on the display area of the relevant item) is performed, a transmission-instruction acceptance screen (not shown) is displayed on the mobile terminal 200 as an example.

A transmission key (software key) for accepting from a user a transmission instruction of the layout information 30 to the multifunction peripheral 300 is provided in the transmission-instruction acceptance screen (not shown). In this case, the setting page SP in which the captured image 10 is laid out may be displayed as a preview. Then, when the transmission instruction is issued to the mobile terminal 200, the layout information 30 is transmitted from the mobile terminal 200 to the multifunction peripheral 300.

When the multifunction peripheral 300 has received the layout information 30, the multifunction-peripheral control section 340 executes a job involving document reading (a copy job or a transmission job) in an automatic layout mode. In execution of the job in the automatic layout mode, an automatic layout process is executed by the multifunction-peripheral control section 340 (its details will be described later).

Hereinbelow, a processing flow for executing a job in the automatic layout mode will be described with reference to the flowchart shown in FIG. 9. The flowchart shown in FIG. 9 gets started at a time point when the multifunction peripheral 300 receives the layout information 30 from the mobile terminal 200. Hereinafter, a captured image 10 laid out within the setting page SP will be referred to simply as captured image 10.

At step S1, the multifunction-peripheral control section 340 moves to the automatic layout mode. Then, at step S2, the multifunction-peripheral control section 340 decides whether or not the operation panel 330 has accepted a start instruction of a job involving document reading. As a result, when the multifunction-peripheral control section 340 decides that the job start instruction has been accepted, the processing flow moves on to step S3. On the other hand, when the multifunction-peripheral control section 340 decides that the job start instruction has not yet been accepted, the decision of step S2 is repeated. In addition, when a predetermined cancel operation is performed on the operation panel 330 after the movement to the automatic layout mode and before the acceptance of the job start instruction, the multifunction-peripheral control section 340 returns from the automatic layout mode to the normal mode.

Upon movement to step S3, the multifunction-peripheral control section 340 makes the image reading section 310 perform document reading to generate image data of a read image obtained by the document reading. The image data of the read image is stored in the multifunction-peripheral storage part 360. Thereafter, the processing flow moves on to step S4.

Figure 10:
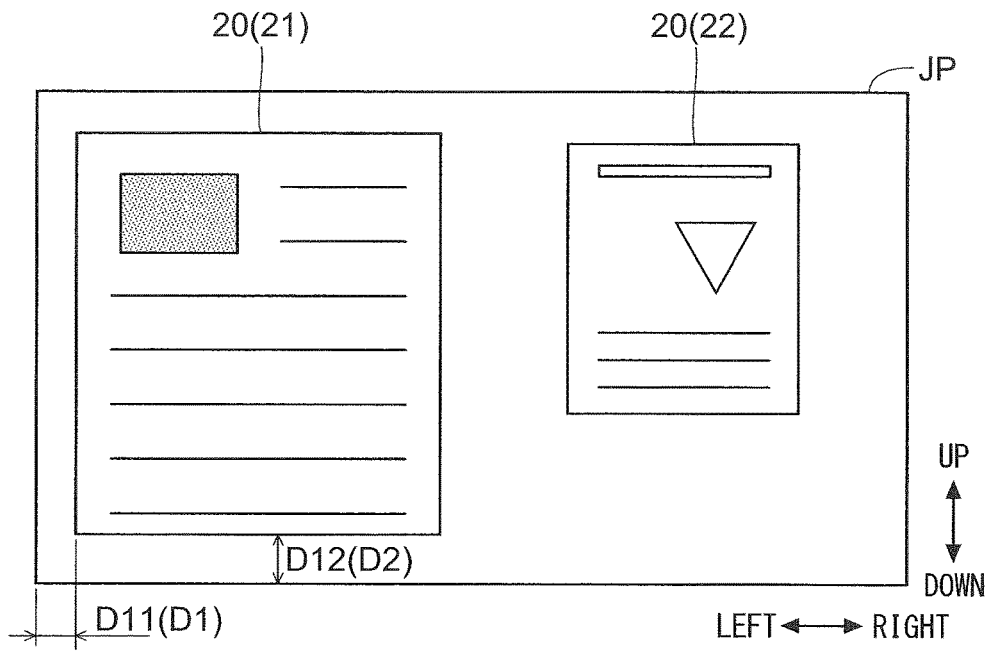
FIG. 10 is a view showing a job page to be generated in the multifunction peripheral forming part of the image forming system according to one embodiment of the disclosure.

Upon movement to step S4, the multifunction-peripheral control section 340 performs an image discrimination process of discriminating a read image corresponding to the captured image 10 as an object image 20 (see FIG. 10). In this image discrimination process, a read image including the same image as the discriminant image 10D included in the layout information 30 is extracted, and the extracted read image is discriminated as an object image 20. For example, the multifunction-peripheral control section 340 recognizes an image having a similarity to the discriminant image 10D equal to or higher than a specified threshold as the same image as the discriminant image 10D. That is, a read image to be discriminated as the object image 20 in the image discrimination process is a read image including an image having a similarity to the discriminant image 10D equal to or higher than a specified threshold.

Thereafter, at step S5, the multifunction-peripheral control section 340 decides whether or not the read image is the object image 20. As a result, when the multifunction-peripheral control section 340 decides that the read image is the object image 20, the processing flow moves on to step S6.

Upon movement to step S6, the multifunction-peripheral control section 340 decides whether or not a plurality of captured images 10 are present. The decision as to whether or not a plurality of captured images 10 are present is made based on a number of discriminant images 10D included in the layout information 30. That is, when the discriminant image 10D is present only one in number, it is decided that the number of captured images 10 laid out within the setting page SP is one; when a plurality of discriminant images 10D are present, the number of captured images 10 laid out within the setting page SP is a plurality.

At step S6, when the multifunction-peripheral control section 340 decides that a plurality of captured images 10 are present, the processing flow moves on to step S7. Then, upon movement to step S7, the multifunction-peripheral control section 340 decides whether or not reading of a plurality of document sheets corresponding to the plurality of captured images 10, respectively, has been fully completed. In other words, the multifunction-peripheral control section 340 decides whether or not reading of the object document, whose read images are to be target objects of the automatic layout process, (the object document is a document including the same image as the discriminant image 10D) has been fully completed. As a result, when the multifunction-peripheral control section 340 decides that reading of the object document sheets has been fully completed (no object document sheets remain unread), the processing flow moves on to step S8. On the other hand, when the multifunction-peripheral control section 340 decides that reading of the object document sheets has not been fully completed (an object document sheet or sheets remain unread), the processing flow moves on to step S3 (reading of a next document is executed). In addition, also when the multifunction-peripheral control section 340 decides at step S6 that the captured image 10 is present one in number, the processing flow moves on to step S8.

Upon movement to step S8, the multifunction-peripheral control section 340 executes the automatic layout process on a basis of layout data (position data, size data and orientation data) indicated by the layout information 30 to generate image data of a job page JP (see FIG. 10). In this process, image data of the job page JP are generated in such a way that layout of the object image 20 in the job page JP becomes similar to the layout of the captured image 10 in the setting page SP indicated by the layout information 30. Hereinbelow, the automatic layout process (a process of generating image data of the job page JP including the object image 20) will be described with reference to FIG. 10 on a case in which object images 21 and 22 corresponding to the captured images 11 and 12, respectively, are laid out within the job page JP.

On the basis of position data of the layout information 30, the multifunction-peripheral control section 340 recognizes a distance D1 from the left side RS1 of the setting page SP to the left side of the captured image 11, and also recognizes a distance D2 from the bottom side RS2 of the setting page SP to the bottom side of the captured image 11. Then, when the object image 21 is laid out within the job page JP, the multifunction-peripheral control section 340 sets a laying position of the object image 21 within the job page JP in such a way that a distance D11 from the left side of the job page JP (a side corresponding to the left side RS1 of the setting page SP) to the left side of the object image 21 becomes equal to the distance D1 and that a distance D12 from the bottom side of the job page JP (a side corresponding to the bottom side RS2 of the setting page SP) to the bottom side of the object image 21 becomes equal to the distance D2. In addition, the laying position of the object image 22 within the job page JP is set on the basis of position data of the captured image 12.

On the basis of size data of the layout information 30, the multifunction-peripheral control section 340 also recognizes a ratio of the size of the captured image 11 to the size of the setting page SP (a setting ratio to be used for the automatic layout process). Then, when the object image 21 is laid out within the job page JP, the multifunction-peripheral control section 340 sets a size of the object image 21 in such a way that a ratio of the size of the object image 21 to the size of the job page JP becomes equal to the setting ratio. In addition, the size of the object image 22 is set on the basis of size data of the captured image 12.

Still more, on the basis of orientation data of the layout information 30, the multifunction-peripheral control section 340 recognizes an orientation of the discriminant image 10D corresponding to the captured image 11. Then, when the object image 21 is laid out within the job page JP, the multifunction-peripheral control section 340 sets an orientation of the object image 21 in such a way that an image of a portion of the object image 21 corresponding to the discriminant image 10D (an image having a similarity to the discriminant image 10D equal to or higher than a specified threshold) is oriented along the same direction as the discriminant image 10D. In addition, the orientation of the object image 22 is set on the basis of orientation data of the captured image 12.

After completion of the automatic layout process, the multifunction-peripheral control section 340 makes the printing section 320 execute printing of the job page JP (this printing is executed when the execution job is a copy job). Otherwise, the multifunction-peripheral control section 340 makes the multifunction-peripheral communication part 350 execute transmission of the job page JP (this transmission is executed when the execution job is a transmission job).

Figure 9:
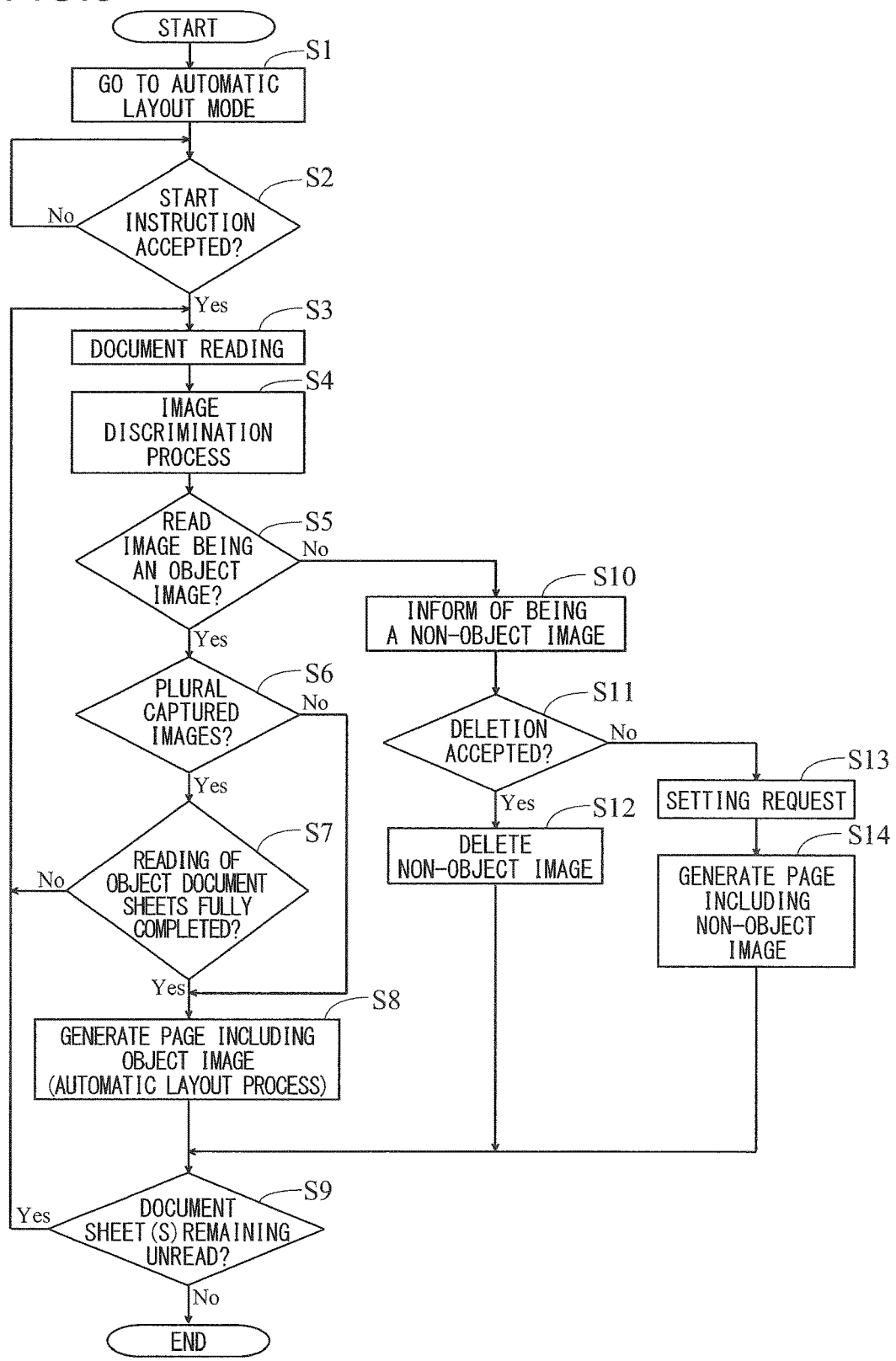
FIG. 9 is a flowchart for explaining a processing flow involved when the multifunction peripheral forming part of the image forming system according to one embodiment of the disclosure has received layout information from a mobile terminal.

Reverting to FIG. 9, upon movement from step S8 to step S9, the multifunction-peripheral control section 340 decides whether or not any document sheet (next document sheet) remains unread on the document conveyance unit 311. As a result, when the multifunction-peripheral control section 340 decides that a document sheet or sheets remain unread, the processing flow moves on to step S3 (reading of the next document sheet is executed). On the other hand, when the multifunction-peripheral control section 340 decides that no document sheets remain unread, this processing flow is ended.

In this connection, when the multifunction-peripheral control section 340 decides, at step S5, that a read image is other than the object image 20, the processing flow moves on to step S10. Upon movement to step S10, the multifunction-peripheral control section 340 makes the operation panel 330 inform the user that a read image is an non-object image. Also, the multifunction-peripheral control section 340 makes the operation panel 330 accept an operation of selecting whether the non-object image is deleted or outputted. Then, at step S11, the multifunction-peripheral control section 340 decides whether or not it has been accepted that the non-object image is to be deleted (whether or not it has been accepted that the non-object image is not to be outputted).

Figure 11:
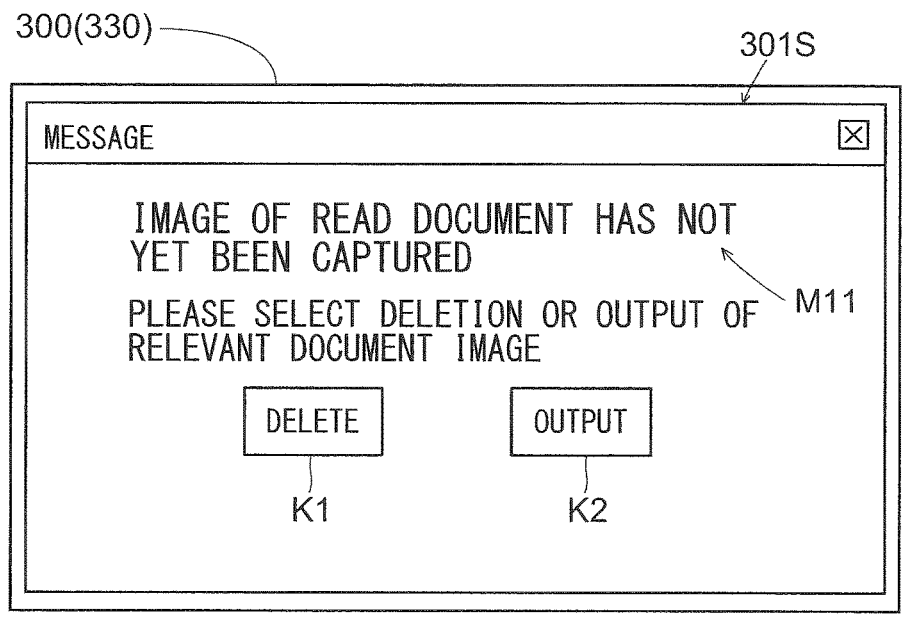
FIG. 11 is a view showing a first information screen to be displayed on the multifunction peripheral forming part of the image forming system according to one embodiment of the disclosure.

For example, the multifunction-peripheral control section 340 makes the operation panel 330 (touch panel display 331) display such a first information screen 301S as shown in FIG. 11 to inform the user that the read image is a non-object image. Although not particularly limited, such a message M11 as 'IMAGE OF READ DOCUMENT HAS NOT YET BEEN CAPTURED' is provided in the first information screen 301S. As a result of this, the user can be informed that the read image is a non-object image.

In order to accept from the user an operation of selecting whether the non-object image is deleted or outputted, the operation panel 330 has selection keys K1 and K2 (software keys) provided in the first information screen 301S. Then, when a touch operation is performed on the selection key K1, the multifunction-peripheral control section 340 decides that deletion of the object image has been accepted. When a touch operation is performed on the selection key K2, the multifunction-peripheral control section 340 decides that output of the object image has been accepted.

Reverting to FIG. 9, when the multifunction-peripheral control section 340 decides at step S11 that deletion of the object image has been accepted, the processing flow moves on to step S12. Upon movement to step S12, the multifunction-peripheral control section 340 deletes image data of the non-object image. Thereafter, the processing flow moves on to step S9.

When the multifunction-peripheral control section 340 decides at step S11 that output of the non-object image (no deletion of the non-object image) has been accepted, the processing flow moves on to step S13. Upon movement to step S13, the multifunction-peripheral control section 340 performs a process for requesting the user to additionally set job execution conditions. Then, at step S14, the multifunction-peripheral control section 340 generates image data of a job page (not shown) including the non-object image on the basis of additionally set setting contents. Thereafter, the processing flow moves on to step S9.

Figure 12:
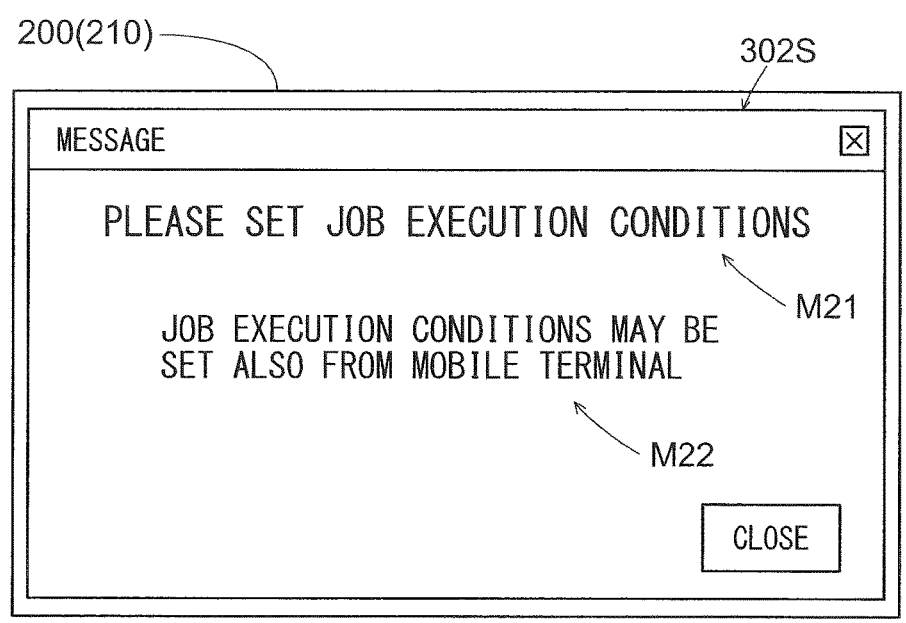
FIG. 12 is a view showing a second information screen to be displayed on the multifunction peripheral forming part of the image forming system according to one embodiment of the disclosure.

For example, the multifunction-peripheral control section 340 makes the operation panel 330 display such a second information screen 302S as shown in FIG. 12 to prompt the user to set job execution conditions. Although not particularly limited, a message M21 such as 'PLEASE SET JOB EXECUTION CONDITIONS' is provided in the second information screen 302S. In addition, setting items as to the job execution conditions are exemplified by 'SHEET SIZE,' 'SCALE-UP/SCALE-DOWN,' and 'PAGE CONSOLIDATION (4-in-1, 2-in-1, etc.)'.

The operation panel 330 also provides such a message M22 as 'JOB EXECUTION CONDITIONS MAY BE SET ALSO FROM MOBILE TERMINAL' in the second information screen 302S, thereby informing the user that job execution conditions can be set by using the mobile terminal 200. In addition, the setting of job execution conditions can also be performed by direct operation on the operation panel 330. This allows the user to additionally set job execution conditions.

With the constitution of this embodiment, a document image is captured by using the mobile terminal 200, and the captured image 10 is laid out within the setting page SP so that layout of the captured image 10 in the setting page SP becomes a desired layout. Thereafter, layout information 30 indicative of the layout of the captured image 10 in the setting page SP is transmitted to the multifunction peripheral 300, and then the multifunction peripheral 300 is made to execute reading of the document (the same document as that of image capture performed by using the mobile terminal 200). As a result, the layout of the read image in the job page JP becomes a desired layout. Accordingly, the work for setting the layout of a read image in the job page JP to a desired layout (the work of changing individual set values for many setting items to desired values one by one, the work of checking those set values, etc.) can be reduced. In other words, the user needs only to capture a document image by using the mobile terminal 200 and perform operations of laying out the captured image 10 within the setting page SP. Thus, the setting work to be performed upon a start of a job involving document reading is reduced, contributing to improvement of user's convenience.

Also with the constitution of this embodiment, when a document different from the document corresponding to the captured image 10 laid out within the setting page SP is read by the multifunction peripheral 300 (when a read image is other than the object image 20), i.e., when an unnecessary document is set on the multifunction peripheral 300 erroneously by a user, the user is informed of the erroneous setting, contributing to further improvement of user's convenience.

In this connection, in some cases for some users, when a job in the automatic layout mode is executed by the multifunction peripheral 300, unnecessary document sheets (document sheets different from those of images captured by the mobile terminal 200) may unintentionally be mixed into a document bundle.

However, with the constitution of this embodiment, since the automatic layout process is executed in the execution of a job in the automatic layout mode, it never occurs that image data of a job page in which an object image 20 and non-object images (read images of unnecessary document sheets) are mixed, or image data of a job page including non-object images alone, are unnecessarily generated. As a result of this, when a document bundle is set on the multifunction peripheral 300, there is no need for the work of checking individual document sheets one by one, contributing to improvement in user's convenience. Furthermore, when a document bundle is set on the multifunction peripheral 300, there is no need for checking the orientation of images of individual document sheets as well.

Also with the constitution of this embodiment, when a read image is a non-object image, the non-object image may be deleted or printing (or transmission) of the job page including the non-object image may be executed, hence a favorable convenience for the user.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An image forming system comprising:
   an information terminal including a camera module and a terminal storage part; and
   an image forming apparatus including an image reading section, wherein
   the terminal storage part stores a captured image obtained by image capturing of a document by the camera module;
   the image reading section reads a document,
   the information terminal displays a setting page for setting a layout of the captured image to accept a setting as to the layout of the captured image in the setting page and transmit, to the image forming apparatus, layout information indicative of the layout of the captured image in the setting page, and
   when executing a job involving document reading, the image forming apparatus reads the document in the image reading section,
   generates image data of a job page which is a page to be used in execution of the job,
   decides whether or not a read image obtained by the document reading corresponds to the captured image so that,
   if the read image corresponds to the captured image, the image forming apparatus generates the image data of the job page including the read image corresponding to the captured image and makes a layout of the read image in the job page similar to the layout of the captured image corresponding to the read image in the setting page and,
   if the read image does not correspond to the captured image, the image forming apparatus informs that the read image does not correspond to the captured image and then either deletes the read image or generates the image data of the job page including the read image based on an additionally made setting.

2. The image forming system according to claim 1, wherein
   when a plurality of the captured images are laid out in the setting page, the information terminal transmits, to the image forming apparatus, the layout information indicative of individual layouts of the plural captured images, respectively, in the setting page, and
   in order to generate image data of the job page including a plurality of the read images corresponding to the plurality of the captured images, respectively, the image forming apparatus makes layouts of the plural read images in the job page similar to the layouts of the captured images corresponding to the read images out of the plural captured images in the setting page.

3. The image forming system according to claim 1, wherein
   the information terminal makes a partial image, which results from partly cutting the captured image, included as a discriminant image in the layout information, and
   the image forming apparatus discriminates, as the object image, the read image including an image identical to the discriminant image.

4. The image forming system according to claim 3, wherein
   the information terminal sets the partial image.

5. The image forming system according to claim 1, wherein
   the layout information includes information indicative of a distance from a predetermined reference side of the setting page to the captured image, and
   in order to generate image data of the job page including the read image corresponding to the captured image, the image forming apparatus makes a distance from a side corresponding to the reference side of the job page to the read image corresponding to the captured image equal to a distance indicated by the layout information.

6. The image forming system according to claim 1, wherein
   the layout information includes information indicative of a ratio of a size of the captured image to a size of the setting page, and
   in order to generate image data of the job page including the read image corresponding to the captured image, the image forming apparatus makes a ratio of a size of the read image corresponding to the captured image to a size of the job page equal to a ratio indicated by the layout information.

7. The image forming system according to claim 1, wherein
   the layout information includes information indicative of an orientation of the captured image in the setting page, and
   in order to generate image data of the job page including the read image corresponding to the captured image, the image forming apparatus makes an orientation of the read image corresponding to the captured image in the job page identical to an orientation indicated by the layout information.

* * * * *